United States Patent
Zhang et al.

(10) Patent No.: US 7,959,845 B1
(45) Date of Patent: Jun. 14, 2011

(54) INJECTION MOLDING METHOD OF STONE-BASED COMPOSITE MATERIAL

(75) Inventors: Jianming Zhang, Ningbo (CN); Jianbo Zhang, Ningbo (CN); Xumin Zhang, Ningbo (CN); Hongbo Zhang, Ningbo (CN)

(73) Assignee: Haitian Plastics Machinery Group, Zhejiang Province (CN)

( * ) Notice: Subject to any disclaimer, the term of this patent is extended or adjusted under 35 U.S.C. 154(b) by 0 days.

(21) Appl. No.: 12/876,606

(22) Filed: Sep. 7, 2010

(30) Foreign Application Priority Data

Dec. 25, 2009 (CN) .......................... 2009 1 0312315

(51) Int. Cl.
*B29C 45/54* (2006.01)
(52) U.S. Cl. .............................. 264/328.17; 264/328.19
(58) Field of Classification Search . 264/328.16–328.19
See application file for complete search history.

(56) References Cited

U.S. PATENT DOCUMENTS

| | | | |
|---|---|---|---|
| 6,365,069 B2 * | 4/2002 | Butler et al. | 264/104 |
| 6,464,910 B1 * | 10/2002 | Smorgon et al. | 264/40.5 |
| 6,471,904 B2 * | 10/2002 | Klaus et al. | 264/328.19 |
| 2006/0061015 A1 * | 3/2006 | Inukai et al. | 264/328.19 |

FOREIGN PATENT DOCUMENTS

KR 2001079127 * 8/2001

* cited by examiner

*Primary Examiner* — Jill L Heitbrink
(74) *Attorney, Agent, or Firm* — Banner & Witcoff, Ltd.

(57) ABSTRACT

The invention provides an injection molding method of stone-based composite material and equipment thereof, wherein the method comprises the following steps: a. putting raw materials into a charging device and then pushing the raw materials into a preforming machine barrel of a preforming device by a pressing component in the charging device; b. keeping the temperature being between 15° C. and 55° C. and compacting the raw materials with the rotation of a preforming screw and transporting the raw materials into a collecting block; c. injecting the raw materials into a mold through a mold gate under the injection force of 50 Mpa to 180 Mpa; d. keeping the temperature of the mold between 140° C. and 200° C. and curing time between 40 seconds and 300 seconds; and e. opening the mold to get the product. The invention has the advantages of simple production process, high acceptance rate of products manufactured, high production efficiency and low production cost. The product has the advantages of high mechanical strength, good fire resistance, thermal stability, corrosion resistance and electrical property, low cost and the like. The product is capable of substituting the majority of thermoset plastics and thermoplastics, thus reducing the usage amount of plastic products and providing powerful support and safeguard for creating resource-conservation and environment-friendly industry.

2 Claims, 13 Drawing Sheets

INJECTION MOLDING METHOD OF STONE-BASED COMPOSITE MATERIAL

FIELD OF THE INVENTION

The invention relates to an injection molding method and equipment thereof, in particular to an injection molding method of stone-based composite material.

BACKGROUND OF THE INVENTION

It is well known that plastics are the product of the petrochemical industry and obtained from non-renewable petroleum resources. Plastic products have been applied in domestic economic fields, such as automobiles, household electrical appliances and articles of daily use, and they are essential to society.

However, petroleum leads to environmental deterioration, greenhouse gas effect and white pollution whilst providing considerable organic raw materials and energy. As the use of petroleum for development is at the expense of environmental destruction and the availability of petroleum resources is limited, it is urgent to cast off petroleum.

Meanwhile, a great deal of stone exists in the natural world and especially many stones that are produced as biproducts during the isolation of various mineral resources. Such stones are required to be excavated and processed in advance, with high consumption of labour and material resources. But excavated stones cannot be utilized and can only be disposed of as waste, which has an impact on the environment.

At present, these stones are sometimes used as the raw materials for making bathroom fittings and a relatively well-developed molding method of manufacture is conducted with a casting shaking method. Take the production of a basin using the casting shaking method for instance. The technological process is mixing, casting, shaking, curing, follow-up processing and surface treatment. For mixing, various additives are mixed in different proportions to make them uniform, and during the casting process, mixed materials are cast in molds and shaken to compact them in the molds. During curing, the cast molds are kept for 30-60 minutes and raw materials are solidified for shaping, while the follow-up processing is to open the molds and conduct a trimming process of the products. Finally, coating is sprayed on the outer surface of the products to finish the surface treatment.

The method for making the products with stones is a complex production process with low acceptance rate of the products, extremely low production efficiency, high production cost and difficulty in mass production. The amount of stones consumed is quite limited. Such use of stones cannot completely use up the existing stones nor replace plastics at a large scale.

With the forgoing method for producing products with stones, the products obtained have poor and unstable quality. The method cannot be applied to produce products with high quality and the low-class products obtained can only be used in cases where high quality products are not required.

Restricted by compacting methods and molds, methods for making products with stones are difficult, especially when the products have a complex structure and special surface treatment, or precise parts such as automobile components or electrical units.

Until now, people considered that only the shaking casting method can be used for making products with stones, hence it is still in the lag phase without advancement. Therefore, to develop a new stone molding technology for replacing plastics has both practical significance and great economic value.

SUMMARY OF THE INVENTION

The invention aims at resolving the technical problem of providing an injection molding method of stone-based composite material in connection with the insufficiency of the prior art, thus being capable of producing products efficiently at low cost and with stable quality.

The invention further provides injection molding equipment of stone-based composite material, thus being capable of fully explaining the injection molding method mentioned above and resolving the existing problem in the current molding method of composite materials based on stone.

The technical proposal adopted by the invention for resolving the technical problem mentioned above is as follows:

An injection molding method of stone-based composite material comprising the following steps, a. putting raw materials into a charging device and then pushing the raw materials into a preforming machine barrel of a preforming device by a pressing component in the charging device;

b. keeping the temperature of the preforming machine barrel between 15° C. and 55° C. and compacting the raw materials with the rotation of a preforming screw, and transporting the raw materials into a collecting block of a sealing device;

c. injecting the raw materials in the collecting block into a mold through a mold gate under the injection force of 50-180 Mpa using an injection device;

d. keeping the temperature of the mold between 140° C. and 200° C. and curing time between 40 seconds and 300 seconds;

e. opening the mold to obtain the product.

In the injection molding method mentioned above, dwelling time can be selected according to the actual situation.

In the injection molding method mentioned above, the best pressing component is a pressing head, which is not only convenient and controllable in operation but also large in pressing area and high in efficiency.

Through extensive research, in connection with a significant change of raw materials, the Applicant finds that eligible products can be produced by the new injection molding method.

The raw materials adopted in the invention are made by taking stone as the main raw material and then adding unsaturated polyester, fiber glass and various additives for fully mixing.

In order to better execute the method mentioned above, the invention also provides an injection molding equipment.

An injection molding equipment of stone-based composite material comprising a preforming device, a sealing device and an injection device;

the sealing device comprises a collecting block and a sealing rod, wherein one side of the collecting block is provided with a first channel and a second channel, both of which are mutually communicated, the first channel being connected with the preforming device, the second channel being connected with the injection device, and the sealing rod is arranged at the communication position between the first channel and the second channel;

a guide sleeve is arranged on the collecting block and the sealing rod penetrates through a hole at the center of the guide sleeve and reaches the communication position between the first channel and the second channel of the collecting block;

the injection device contacts a mold gate.

In respect of the injection molding equipment of stone-based composite material, the injection mechanism also comprises a charging device fixedly connected with the preforming device.

In respect of the injection molding equipment of stone-based composite material, the charging device comprises a pressing drive device, a charging tipping bucket, a storing barrel and a pressing head, all of which are set successively from top to bottom, and the pressing head moves in the storing barrel in a sealed way under the drive of the pressing drive device to press the raw materials into the preforming device.

In respect of the injection molding equipment of stone-based composite material, the charging device also comprises a charging device underplate which is connected with the preforming device.

In the injection molding equipment of stone-based composite material mentioned, the charging device comprises a storing barrel, both ends of which are provided with a charging underplate and a charging device underplate, respectively;

a charging slipper block is arranged above the charging underplate, and the charging underplate and the charging slipper block can move relatively;

guide rails are provided on both sides of the charging underplate to guide the charging slipper block;

a flat push oil cylinder is provided on the external side of the guide rails to make the charging slipper block move levelly by a pull block.

In the injection molding equipment of stone-based composite material, an oil cylinder bracket and a pressing oil cylinder are both arranged above a large hole of the charging slipper block;

the pressing oil cylinder is provided with pressing pistons which are connected with each other, and is connected with a pressing piston rod;

the bottom of the pressing piston rod is connected with the pressing head by a flange and a storing barrel is arranged above another large hole of the charging slipper board.

In the injection molding equipment of stone-based composite material, the pressing drive device is a pressing oil cylinder, the pressing piston of which is connected with the upper end of the pressing piston rod, and the lower end of the pressing piston rod is connected with the pressing head which moves in the storing barrel in a sealed way.

In the injection molding equipment of stone-based composite material, the pressing piston rod is connected with the pressing head by a flange and a gland bush is provided between the flange and the pressing head for sealing.

In the injection molding equipment of stone-based composite material, the preforming device comprises a preforming drive device, a preforming machine barrel and a preforming screw; the preforming screw is arranged in the preforming machine barrel and is driven by the preforming drive device;

the front end of the preforming machine barrel is provided with a preforming front machine barrel.

In the injection molding equipment of stone-based composite material, the preforming device also comprises a preforming bearing seat, and the preforming machine barrel is arranged on one side of the preforming bearing seat and is connected with the charging underplate in the charging device.

In the injection molding equipment of stone-based composite material, the sealing device further comprises a sealing cylinder front cover, a sealing oil cylinder and a sealing cylinder rear cover above the collecting block;

a sealing piston and a sealing piston rod are arranged in the sealing oil cylinder, and the sealing piston rod is connected with the sealing rod.

In the injection molding equipment of stone-based composite material, the collecting block is also provided with an adjusting bolt which penetrates through the sealing cylinder rear cover and then enters into the position above the sealing piston in the sealing oil cylinder body.

In the injection molding equipment of stone-based composite material, the lower part of the collecting block is fixed by the collecting block bearing bracket.

In the injection molding equipment of stone-based composite material, the charging device comprises an injection machine barrel, an injection seat, an injection rod and an injection drive device;

the injection rod is arranged in the injection machine barrel and is driven by the injection drive device;

the injection machine barrel is arranged in the second channel of the collecting block, the injection machine barrel and the injection drive device are arranged on the injection seat, a front machine barrel and a small nozzle are arranged on the other side of the collecting block, and the small nozzle contacts the mold gate.

In the injection molding equipment of stone-based composite material, the collecting block is moveably connected with the preforming front machine barrel and with the injection machine barrel.

In respect of the injection molding equipment of stone-based composite material, the injection mechanism also comprises a sliding transportation device;

the sliding transportation device comprises a guide rod component arranged on the machine frame;

the guide rod component comprises a guide rode pedestal and injection table guide rod;

the guide rod pedestal is fixed on the machine frame;

the injection table guide rod is fixed on the guide rod pedestal.

In respect of the injection molding equipment of stone-based composite material, the sliding transportation device also comprises a mold board and a sliding transportation drive component fixedly connected with the mold board;

the sliding transportation drive component comprises a sliding transportation oil cylinder, a sliding transportation connector and a sliding transportation piston rod;

the sliding transportation oil cylinder is fixed on the injection seat;

the sliding transportation piston rod is fixed on the mold board by a sliding transportation connector.

The injection molding equipment of stone-based composite material is characterized in comprising a preforming device, a sealing device and an injection device;

the preforming device comprises an injection table front board, an injection table rear board, a screw rotation mechanism and a screw movement mechanism, wherein the screw rotation mechanism is fixed on the injection table rear board and is connected with the injection device, and the screw movement mechanism is arranged on the injection table front board;

the sealing device comprises a thrust ring and a non-return ring, wherein the non-return ring is arranged at the outlet end of the injection device, the thrust ring contacts with the non-return ring, and both of them serve a sealing function;

the injection device comprises a machine barrel, a transitional nozzle, a small nozzle, a screw and a screw head, wherein the machine barrel is arranged on the injection table front board and the screw is arranged in the machine barrel, the top of the screw is provided with the screw head, the end part of the machine barrel is provided with the transitional nozzle, and the end of the transitional nozzle is provided with the small nozzle.

Compared with the prior art, the invention has the following advantages,

In respect of the method for producing products according to the invention, the production process is simple and the acceptance rate of the products produced is high, thus being high in production efficiency and low in production cost, and being capable of producing a large number of products.

The products produced by the method for producing products provided by the invention are highand stable in quality. The method is capable of being used to produce products requiring high quality and ones with complicated structure and special surface treatment. Such products can completely substitute such existing precision components such as automobile component, electrical component or parts and the like.

In the invention, the products produced by the molding technique have the advantages of high mechanical strength, good fire resistance, thermal stability, corrosion resistance, electrical property, low cost and very wide application range. They can be used in the automobile industry, such as car light reflector, heater case, automobile igniter, hood and the like, as electrical components, such as high-voltage device, relay base, coil framework, knife switch table, fuse box and the like, and as articles for daily use, such as microwave oven tableware, electric iron outer shell and sanitary products including urinal, basin, bathtub and the like.

They are capable of substituting the majority of thermoset plastics and thermoplastics, thus reducing the consumption of plastic products and providing powerful support and safeguard for creating resource-conservation and environment-friendly industry.

The use of the products produced by the invention is capable of reducing the consumption of plastic products and petroleum, thus contributing to the conservation of petroleum resources.

The application of the invention can change waste stones into valuable materials, thus inevitably resulting in enormous economic and social benefits.

The main components of the products are stone, the density and strength of which are higher than those of plastics, thus the products have better performance than plastics and the products can be applied to more fields.

DETAILED DESCRIPTION OF THE INVENTION

Figure 1:
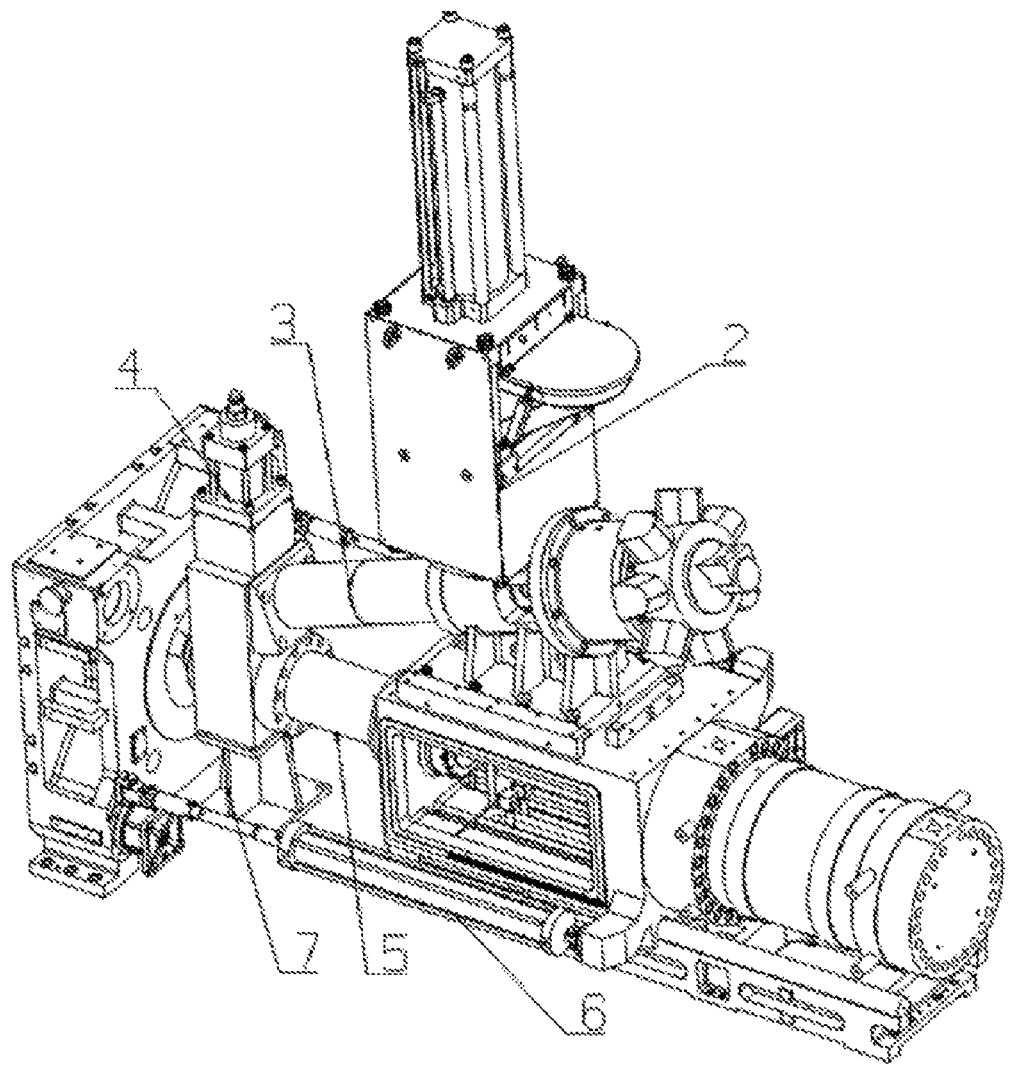
FIG. 1 is the overall outline structural drawing of the feeding system of the invention.

A more detailed description of the invention is given as follows by combining the embodiments in the drawings.

Embodiment 1

A Car Light Reflector Injection-Molded Using Stone-Based Composite Material

Well prepared raw materials are put in the storing barrel of the injection molding equipment and pressed into the preforming machine barrel by the pressing head driven by the pressing piston. The set temperature of the preforming machine barrel is 25° C. The raw materials are transported forward into the collecting block by the rotation of the preforming screw and the preforming screw retreats whilst rotating. Injection is carried out by the injection device under the injection pressure of 68 Mpa to 80 Mpa and the injection speed of 15 mm/s to 25 mm/s to inject the raw materials into the mold through the mold gate. Pressure is maintained for 3 seconds and the temperature of the mold is 160° C. The raw materials are cured for 65 seconds in the mold. Finally, the mold is opened to obtain the product.

With measurement, the product mentioned above has bending strength of 130 Mpa, tensile strength of 29 Mpa and impact strength of 29 KJ/M2, thus completely meeting the use requirements.

Embodiment 2

An Electric Iron Base Injection-Molded Using Stone-Based Composite Material

Well prepared raw materials are put in the storing barrel of the injection molding equipment and pressed into the preforming machine barrel by the pressing head driven by the pressing piston. The set temperature of the preforming machine barrel is 17° C. The raw materials are transported forward into the collecting block by the rotation of the preforming screw and the preforming screw retreats whilst rotating. Injection is carried out by the injection device under the injection pressure of 42 Mpa to 52 Mpa and the injection speed of 55 mm/s to 70 mm/s to inject the raw materials into the mold through the mold gate. Pressure is maintained for 2 seconds and the temperature of the mold is 180° C. The raw materials are cured for 35 seconds in the mold. Finally, the mold is opened to obtain the product.

With measurement, the product mentioned above has bending strength of 132 Mpa, tensile strength of 31 Mpa and impact strength of 32 KJ/M2.

Embodiment 3

An Automobile Cigarette Lighter Base Injection-Molded Using Stone-Based Composite Material Well prepared raw materials are put in the storing barrel of the injection molding equipment and pressed into the preforming machine barrel by the pressing head driven by the pressing piston. The set temperature of the preforming machine barrel is 25° C. The raw materials are transported forward into the collecting block by the rotation of the preforming screw and the preforming screw retreats whilst rotating. Injection is carried out by the injection device under the injection pressure of 52 Mpa to 63 Mpa and the injection speed of 8 mm/s to 15 mm/s to inject the raw materials into the mold through the mold gate. No pressure maintenance is provided and the temperature of the mold is 175° C. The raw materials are cured for 147 seconds in the mold. Finally, the mold is opened to obtain the product.

With measurement, the product mentioned above has bending strength of 129 Mpa, tensile strength of 28 Mpa and impact strength of 27 KJ/M2.

Embodiment 4

An Electrical Connector Injection-Molded Using Stone-Based Composite Material

Well prepared raw materials are put in the storing barrel of the injection molding equipment and pressed into the preforming machine barrel by the pressing head driven by the pressing piston. The set temperature of the preforming machine barrel is 20° C. The raw materials are transported forward into the collecting block by the rotation of the preforming screw and the preforming screw retreats whilst rotating. Injection is carried out by the injection device under the injection pressure of 26 Mpa to 32 Mpa and the injection speed of 8 mm/s to 10 mm/s to inject the raw materials into the mold through the mold gate. Pressure is maintained for 7 seconds and the temperature of the mold is 168° C. The raw materials are cured for 60 seconds in the mold. Finally, the mold is opened to obtain the product.

With measurement, the product mentioned above has bending strength of 135 Mpa, tensile strength of 33 Mpa and impact strength of 32 KJ/M2, thus completely meeting the requirements of electrical connectors.

Embodiment 5

An Electric Kettle Injection-Molded Using Stone-Based Composite Material

Well prepared raw material are put in the storing barrel of the injection molding equipment and pressed into the preforming machine barrel by the pressing head driven by the pressing piston. The set temperature of the preforming machine barrel is 25° C. The raw materials are transported forward into the collecting block by the rotation of the preforming screw and the preforming screw retreats whilst rotating. Injection is carried out by the injection device under the injection pressure of 40 Mpa to 50 Mpa and the injection speed of 18 mm/s to 25 mm/s to inject the raw materials into the mold through the mold gate. Pressure is maintained for 1 second and the temperature of the mold is 150° C. The raw materials are cured for 45 seconds in the mold. Finally, the mold is opened to get the product.

With measurement, the product mentioned above has bending strength of 132 Mpa, tensile strength of 30 Mpa and impact strength of 31 KJ/M2.

It can be proved by the above embodiments that the invention shows originality to use the injection molding method of stone-based composite material to make products using stone as the main component. The method adopted is completely feasible, thus realizing the purpose of the invention.

The invention only lists the above relatively typical products obtained by the injection molding method. Furthermore, more changes can be made to the production conditions and products under the same molding mechanism. Such changes can be derived from the methods mentioned above, thus being still within the scope of the invention.

The invention also provides production equipment designed according to the injection molding methods mentioned above.

Figure 2:
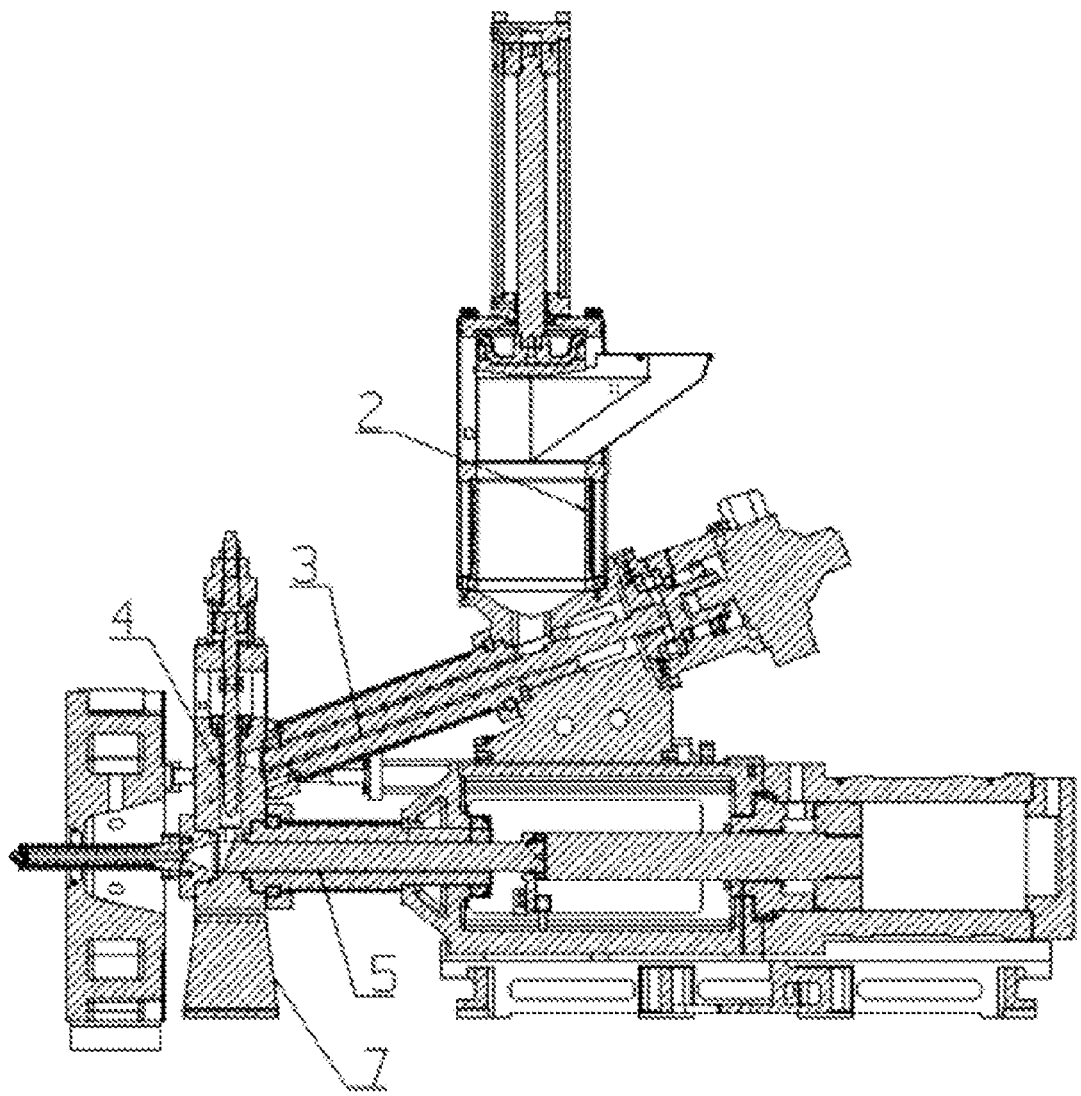
FIG. 2 is the overall outline cutaway view of the feeding system of the invention.

As shown in FIG. 1 and FIG. 2, the injection molding equipment of stone-based composite material comprises a charging device 2, a preforming device 3, a sealing device 4, an injection device 5, a sliding transportation device 6 and a discharging device 7.

Figure 3:
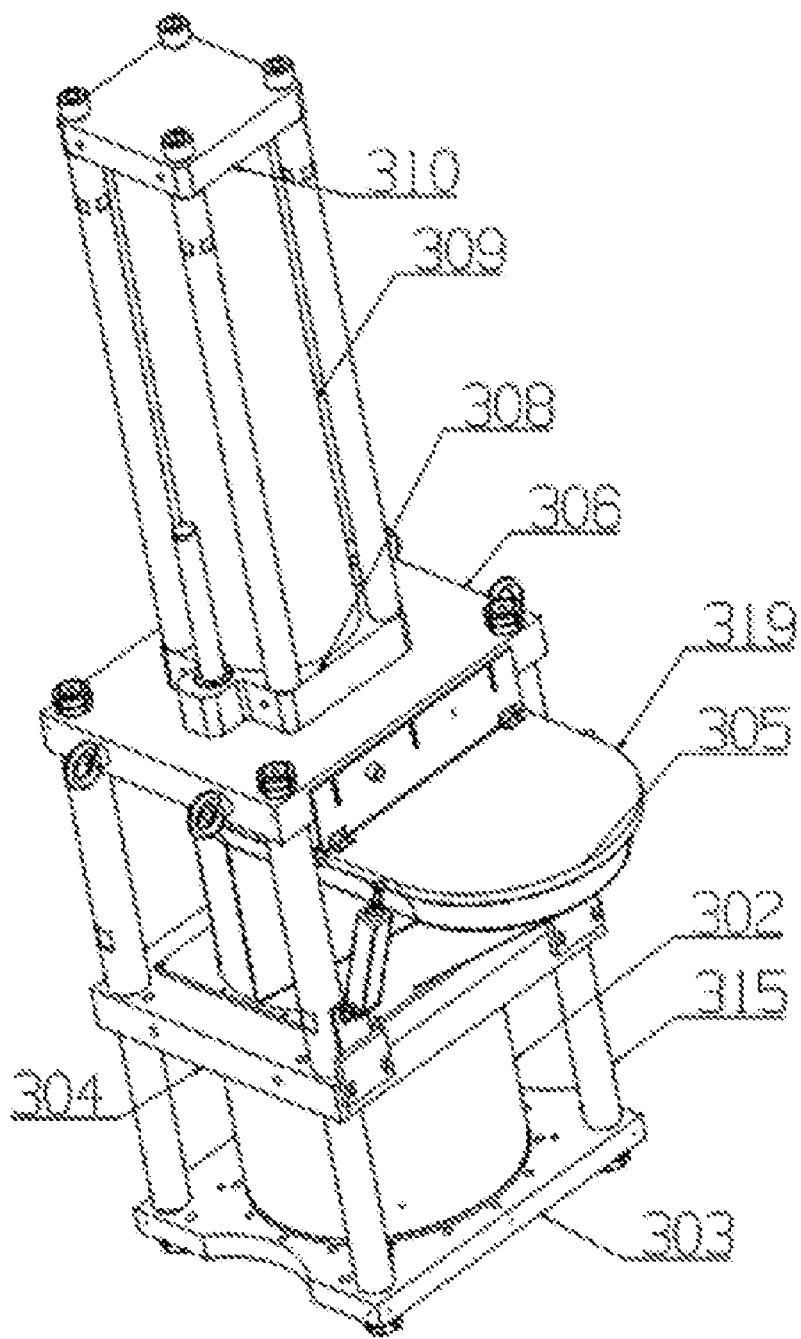
FIG. 3 is the assembly drawing of the charging device of the invention.
Figure 4:
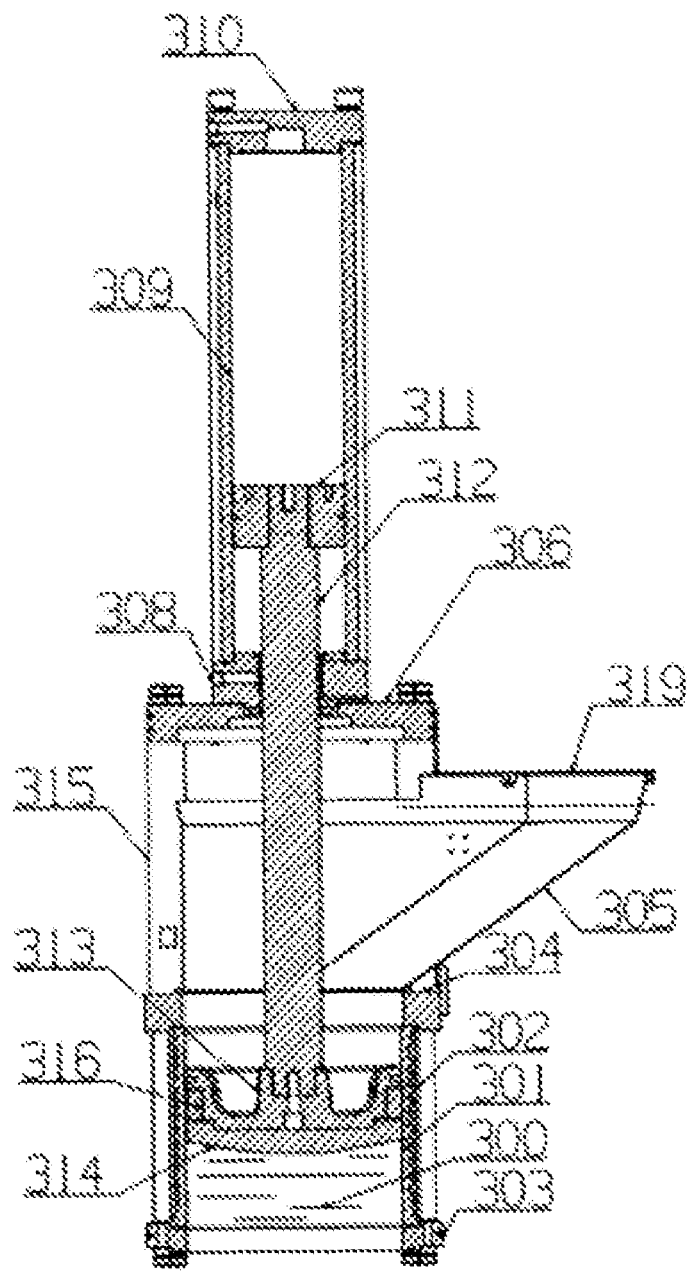
FIG. 4 is the cutaway view of the charging device of the invention.

As shown in the FIG. 3 and FIG. 4, a storing barrel 301 in the charging device 2 is used for containing the stone-based composite material 300, a storing barrel bush 302 is arranged on the exterior of the storing barrel 301, and temperature control liquid can be injected into a spiral groove between the storing barrel 301 and the storing barrel bush 302 to control temperature. A charging device underplate 303 is under the storing barrel 301, a charging tipping bucket underplate 304 is above the storing barrel 301, a charging tipping bucket 305 is fixed above the charging tipping bucket underplate 304. A charging oil cylinder underplate 306 is arranged above the charging tipping bucket 305. The charging device underplate 303, the charging tipping bucket underplate 304 and the charging oil cylinder underplate 306 are connected in series by a pull rod 315. A pressing cylinder front cover 308, a pressing oil cylinder 309 and a pressing cylinder rear cover 310 are arranged above the charging oil cylinder underplate 306. A pressing piston 311 and a pressing piston rod 312 are arranged in the pressing oil cylinder 309. The lower part of the pressing piston rod 312 is connected with a pressing head 314 by a pressing connection flange 313.

Both the pressing cylinder front cover 308 and the pressing cylinder rear cover 310 are provided with through holes, thus oil liquid is capable of entering and exiting the pressing oil cylinder 309. When the oil liquid enters the lower part of the pressing oil cylinder 309 through the pressing cylinder front cover 308, the pressing piston 311 elevates and the oil liquid in the upper part of the pressing oil cylinder 309 flows out through the pressing cylinder rear cover 310. The rise of the pressing piston 311 drives the rise of the pressing piston rod 312, the pressing connection flange 313 and the pressing head 314 and finally causes the pressing head 314 to separate from the storing barrel 301. At this time, the stone-based composite material 300 can be put into the storing barrel 301 through the charging tipping bucket 305.

When the oil liquid enters the upper part of the pressing oil cylinder 309 through the pressing cylinder rear cover 310, the pressing piston 311 descends and the oil liquid in the lower part of the pressing oil cylinder 309 flows out through the pressing cylinder front cover 308. The descending of the pressing piston 311 drives the descending of the pressing piston rod 312, the pressing connection flange 313 and the pressing head 314 and finally causes the pressing head 314 to enter into the storing barrel 301. In this way, the pressing head 314 extrudes the stone-based composite material 300 in the storing barrel 301 to cause the stone-based composite material 300 to enter into the preforming device 3 under the charging device 2.

A seal ring 316 is arranged along the external edge of the pressing connection flange 313. When the pressing head 314 enters into the storing barrel 301 and extrudes the stone-based composite material 300, the seal ring 316 closely matches with the storing barrel 301 so as to prevent the stone-based composite material 300 from crossing the external edge of the seal ring 316.

A charging tipping bucket cover 319 is arranged at the opening part of the charging tipping bucket 305 and the charging tipping bucket cover 319 can be turned over and put down, thus playing a safety and dustproof role.

In the embodiment, the pressing piston 311 is adopted to drive the movement of the pressing head 314, but motor or other modes can be adopted to drive the movement of the pressing head 314. Such modes are also within the scope of the invention.

Figure 5:
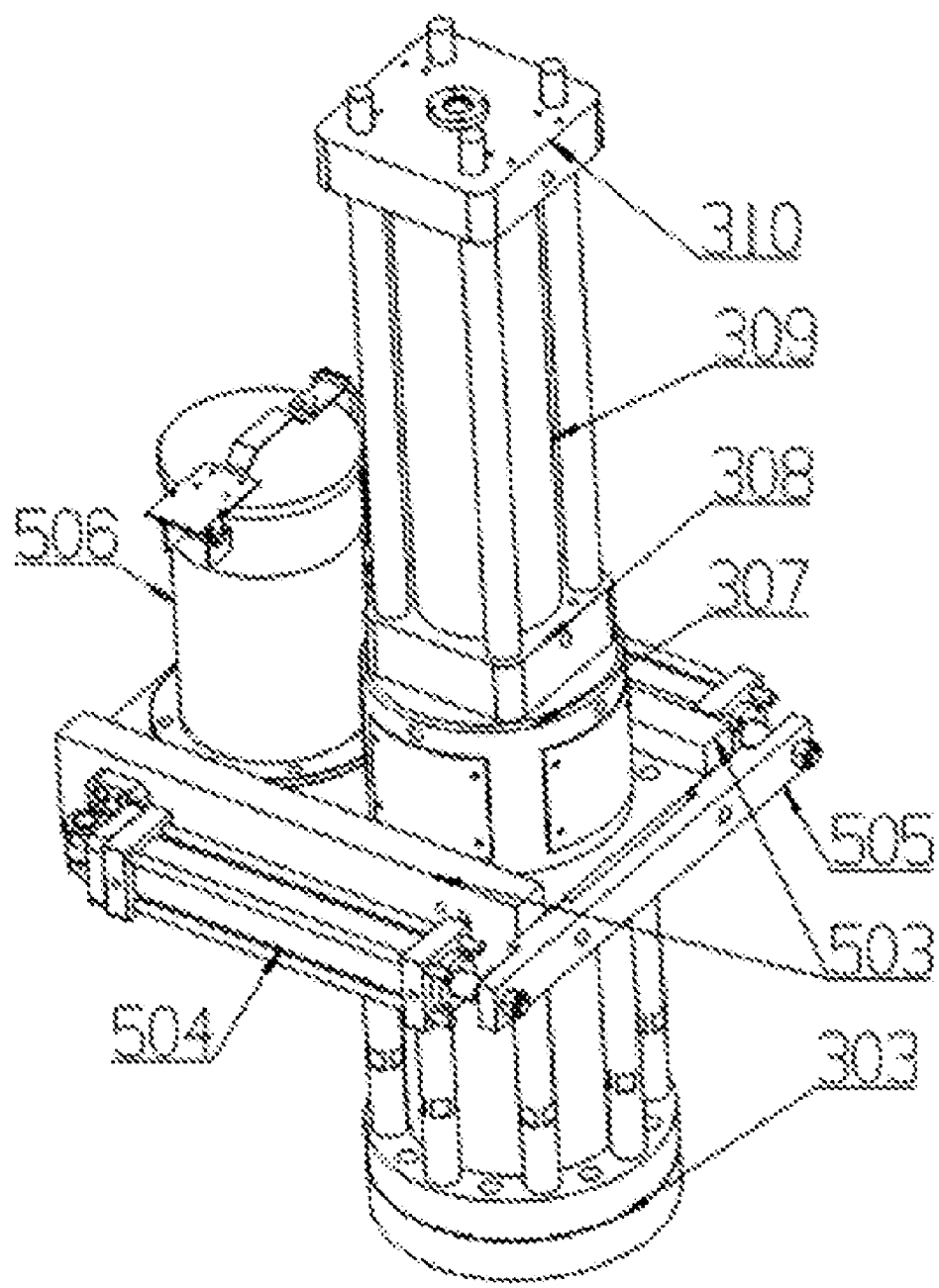
FIG. 5 is the assembly drawing of another charging device of the invention.
Figure 6:
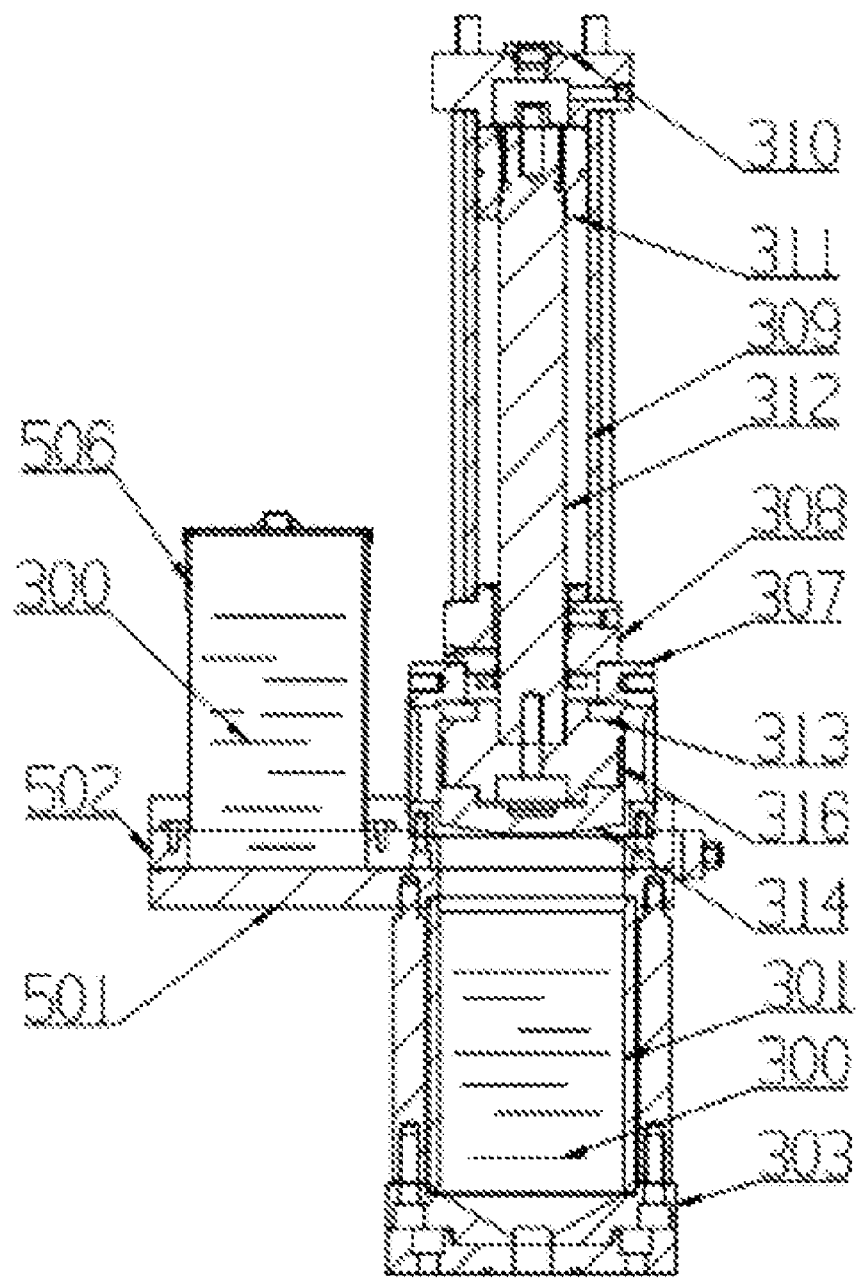
FIG. 6 is the cutaway view of another charging device of the invention.

As shown in FIG. 5 and FIG. 6, the charging device 2 has another structure. The storing barrel 301 in the charging device 2 is used for containing stone-based composite material 300. The charging device underplate 303 is under the storing barrel 301, a charging underplate 501 is above the storing barrel 301, a charging slipper block 502 is above the charging underplate 501. The charging underplate 501 and the charging slipper block 502 can move relatively. Guide rails 503 are provided on both sides of the charging underplate 501 to guide the charging slipper block 502. A flat push oil cylinder 504 is provided on the external side of the guide rails 503 to make the charging slipper block 505 move levelly by a pull block 505. An oil cylinder bracket 307, a pressing cylinder front cover 308, a pressing oil cylinder 309 and a pressing cylinder rear cover 310 are arranged above a large hole of the charging slipper block 502. A pressing piston 311 and a pressing piston rod 312 are arranged in the pressing oil cylinder 309. The lower part of the pressing piston rod 312 is connected with a pressing head 314 by a pressing connection flange 313. A feed preparation barrel 506 is arranged on another large hole of the charging slipper block 502.

Both the pressing cylinder front cover 308 and the pressing cylinder rear cover 310 are provided with through holes, thus oil liquid is capable of entering and exiting the pressing oil cylinder 309. When the oil liquid enters the lower part of the pressing oil cylinder 309 through the pressing cylinder front cover 308, the pressing piston 311 elevates and the oil liquid in the upper part of the pressing oil cylinder 309 flows out through the pressing cylinder rear cover 310. The rise of the pressing piston 311 drives the rise of the pressing piston rod 312, the pressing connection flange 313 and the pressing head 314 and finally causes the pressing head 314 to separate from the storing barrel 301. The stone-based composite material 300 can be put in the feed preparation barrel 506 in advance. The charging slipper block 502 is driven by the flat push oil cylinder 504 to move the feed preparation barrel 506 to the place above the storing barrel 301. At this time, the stone-based composite material 300 in the feed preparation barrel 506 drops into the storing barrel 301.

Then the charging slipper block 502 is pulled by the flat push oil cylinder 504 to move the pressing head 314 to the place above the storing barrel 301. When the oil liquid enters the upper part of the pressing oil cylinder 309 through the pressing cylinder rear cover 310, the pressing piston 311 descends and the oil liquid in the lower part of the pressing oil cylinder 309 flows out through the pressing cylinder front cover 308. The descending of the pressing piston 311 drives the descending of the pressing piston rod 312, the pressing connection flange 313 and the pressing head 314 and finally causes the pressing head 314 to enter into the storing barrel 301. In this way, the pressing head 314 extrudes the stone-based composite material 300 in the storing barrel 301 to cause the stone-based composite material 300 to enter into the preforming device 3 under the charging device 2.

A seal ring 316 is arranged along the external edge of the pressing connection flange 313. When the pressing head 314 enters into the storing barrel 301 and extrudes the stone-based composite material 300, the seal ring 316 closely matches with the storing barrel 301 so as to prevent the stone-based composite material 300 from crossing the external edge of the seal ring 316.

Figure 7:
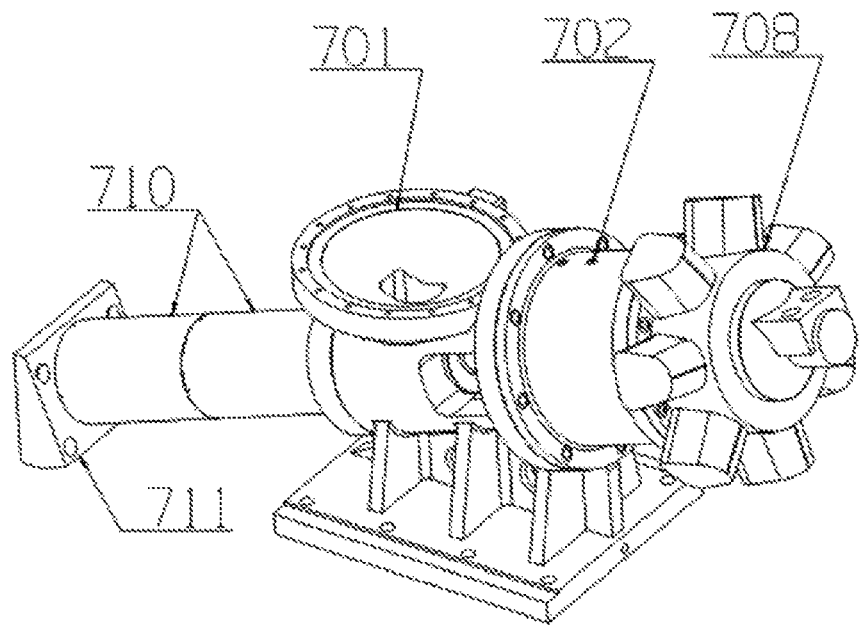
FIG. 7 is the assembly drawing of the preforming device of the invention.
Figure 8:
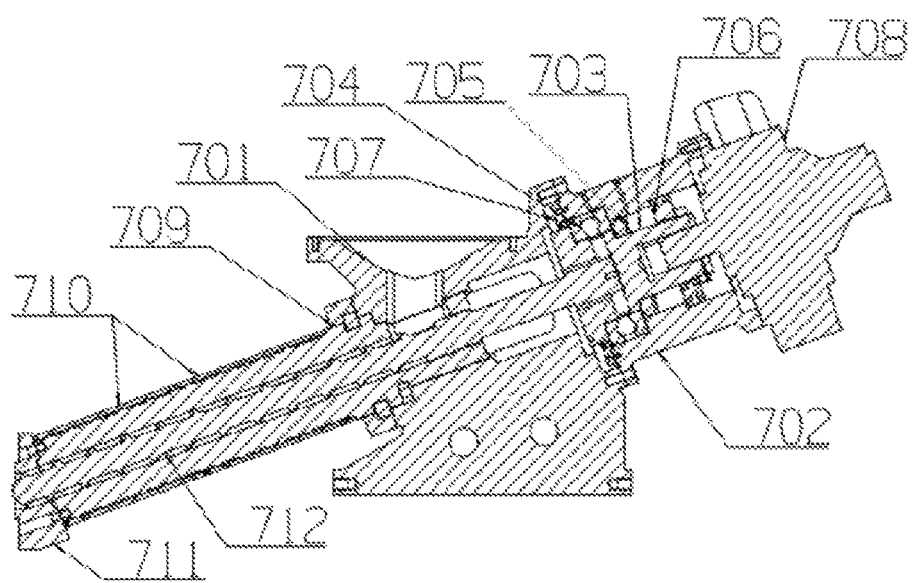
FIG. 8 is the cutaway view of the preforming device of the invention.

As shown in FIG. 7 and FIG. 8, a preforming bearing seat 701 in the preforming device is arranged under the charging device 2. A preforming seat 702 is arranged on the preforming bearing seat 701 and a coupling 703, a bearing 704, a bearing 705, a bearing 706 and an oil seal cover 707 are arranged in the preforming seat 702. An oil motor 708 is arranged on the preforming seat 702 and the shaft of the oil motor 708 is connected with the coupling 703. A preforming machine barrel 709 is installed on the other side of the preforming bearing seat 701, a preforming machine barrel bush 710 is arranged on the external side of the preforming machine barrel 709, and temperature control liquid can be injected into a spiral groove between the preforming machine barrel 709 and the preforming machine barrel bush 710 to control temperature. A preforming front machine barrel 711 is arranged at the front end of the preforming machine barrel 709 and a preforming screw 712 is arranged in the preforming machine barrel 709. The preforming screw 712 is connected with the coupling 703.

The oil motor 708 is driven to rotate by pressure oil and the oil motor 708 drives the preforming screw 712 to rotate through the coupling 703. The stone-based composite material 300 is pressed into the feed inlet of the preforming machine barrel 709 by the charging device 2 through the preforming bearing seat 701. The stone-based composite material 300 that enters into the feed inlet of the preforming machine barrel 709 can move forward along the preforming machine barrel 709 and enter into the sealing device 4 through the preforming front machine barrel 711 due to the rotation of the preforming screw 712.

In the embodiment, the preforming screw 712 of the oil motor 708 is adopted, but the preforming screw 712 of motor or other modes can be adopted as well, which is also within the scope of the invention.

Figure 9:
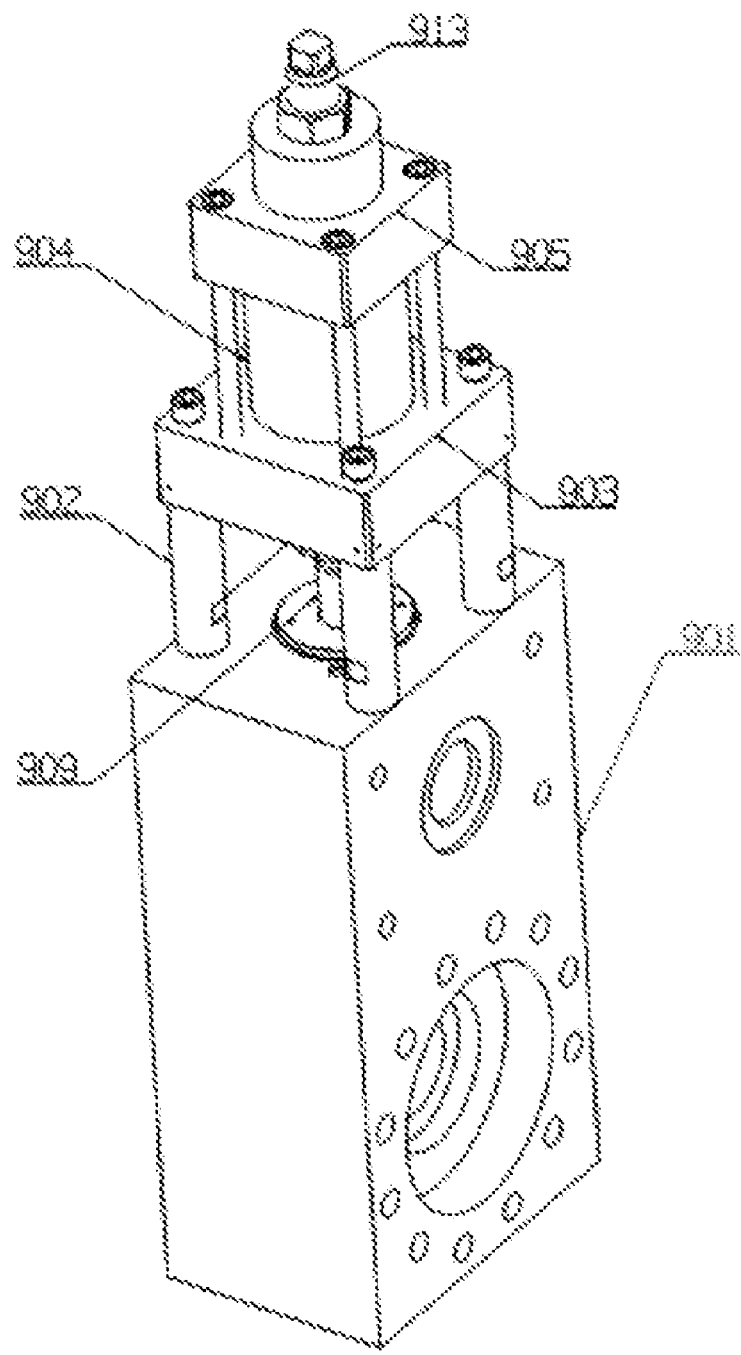
FIG. 9 is the assembly drawing of the sealing device of the invention.
Figure 10:
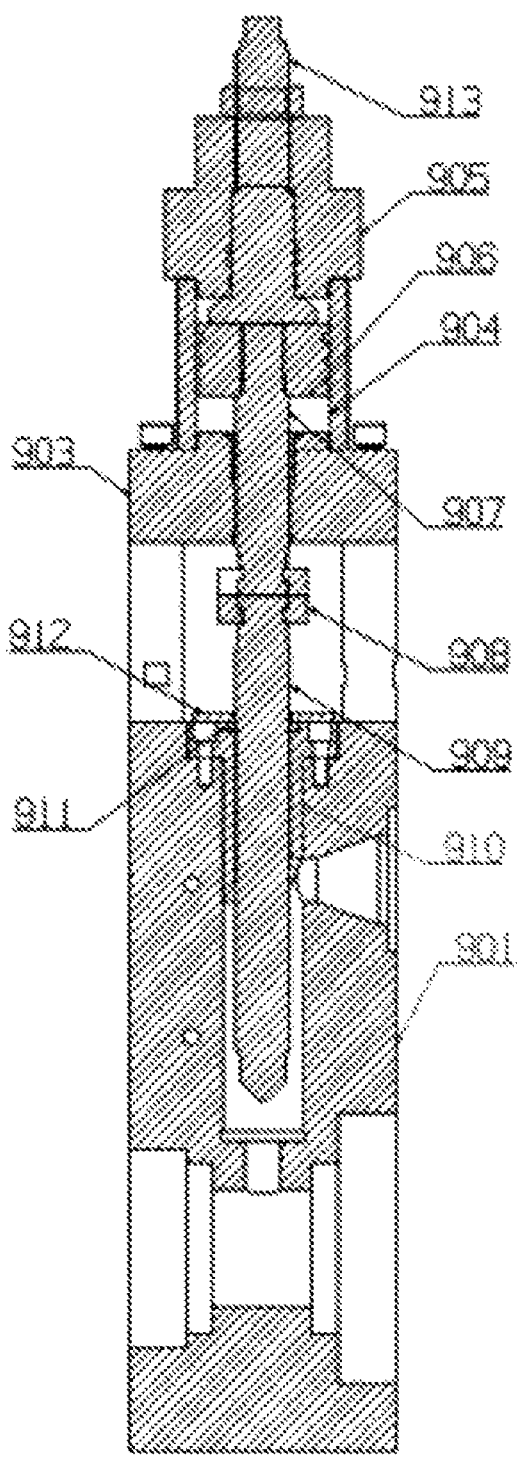
FIG. 10 is the cutaway view of the sealing device of the invention.

As shown in FIG. 9 and FIG. 10, a collecting block 901 in the sealing device 4 is connected with the preforming front machine barrel 711 in the preforming device 3. A prop 902, a sealing cylinder front cover 903, a sealing oil cylinder 904 and a sealing cylinder rear cover 905 are arranged above the collecting block 901. A sealing piston 906 and a sealing piston rod 907 are arranged in the sealing oil cylinder 904. The lower part of the sealing piston rod 907 is connected with a sealing rod 909 by a hough 908.

A guide sleeve 910 is arranged on the collecting block 901 and the sealing rod 909 penetrates through the hole at the center of the guide sleeve 910 and enters into the collecting block 901, thus being capable of better guiding the sealing rod 909.

Both the sealing cylinder front cover 903 and the sealing cylinder rear cover 905 are provided with through holes (not indicated), thus oil liquid is capable of entering and exiting the sealing oil cylinder 904. When the oil liquid enters the lower part of the sealing oil cylinder 904 through the sealing cylinder front cover 903, the sealing piston 906 elevates and the oil liquid in the upper part of the sealing oil cylinder 904 flows out through the sealing cylinder rear cover 905. The rise of the sealing piston 906 drives the rise of the hough 908, the sealing rod 909 and the like, and finally causes the sealing rod 909 not to block the discharging hole under the collecting block 901 any longer. At this time, the stone-based composite material 300 in the preforming device can enter into the lower hole of the collecting block 901. Upon preforming, the lower discharging hole of the collecting block 901 is open, so that the stone-based composite material 300 can enter into the lower hole of the collecting block 901.

When the oil liquid enters the upper part of the sealing oil cylinder 904 through the sealing cylinder rear cover 905, the sealing piston 906 descends and the oil liquid in the lower part of the sealing oil cylinder 904 flows out through the sealing cylinder front cover 903. The descending of the sealing piston 906 drives the descending of the hough 908, the sealing rod 909 and the like, and finally causes the sealing rod 909 to block the discharging hole under the collecting block 901. At this time, the stone-based composite material 300 in the preforming device 3 cannot enter into the lower hole of the collecting block 901 and the stone-based composite material 300 in the lower hole of the collecting block 901 cannot flow backwards either. Upon the injection of a machine, the stone-based composite material 300 in the lower hole of the collecting block 901 can be prevented from flowing backwards into the preforming device 3.

A seal ring 911 and a seal ring gland 912 are also arranged above the guide sleeve 910 and fit tightly with each other, thus preventing the stone-based composite material 300 from crossing the external edge of the seal ring 911.

An adjusting bolt 913 is arranged on the sealing cylinder rear cover 905. It enters into the space above the sealing piston 906 in the sealing oil cylinder 904 after penetrating through the sealing cylinder rear cover 905, and can limit the highest position the sealing piston 906 can rise to. Rotating the adjusting bolt 913 and adjusting the position of the adjusting bolt 913 on the sealing cylinder rear cover 905 can adjust the highest position the sealing piston 906 can rise to and relatively adjust the highest position the sealing rod 909 can rise to, namely the distance between the sealing rod 909 and the opening of the collecting block 901, thereby adjusting the size of the flow passage mouth.

Figure 11:
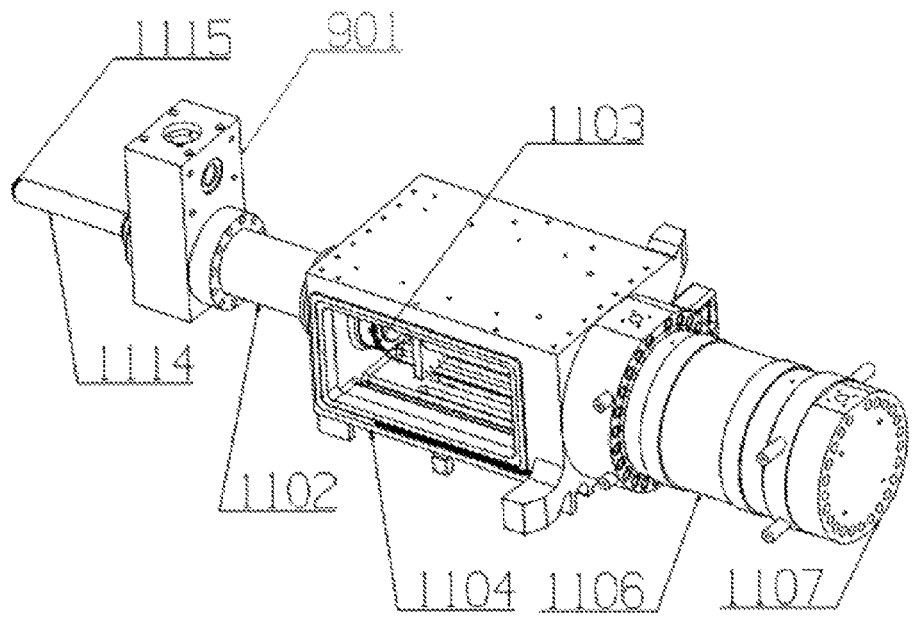
FIG. 11 is the assembly drawing of the injection device of the invention.
Figure 12:
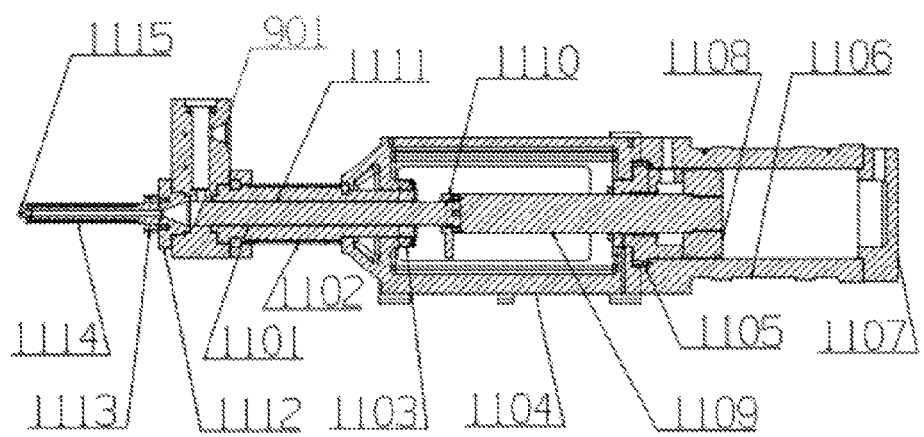
FIG. 12 is the cutaway view of the injection device of the invention.

As shown in FIG. 11 and FIG. 12, the injection device 5 is arranged under the sealing device 4. An injection machine barrel 1101 is installed on the collecting block 901, an injection machine barrel bush 1102 is arranged on the external side of the injection machine barrel 1101, and temperature control liquid can be injected into a spiral groove between the injection machine barrel 1101 and the injection machine barrel bush 1102 to control temperature. The injection machine barrel 1101 is arranged on the injection seat 1104 using screw nuts 1103. The injection seat 1104 is also provided with an injection cylinder front cover 1105, an injection oil cylinder 1106 and an injection cylinder rear cover 1107. An injection piston 1108 and an injection piston rod 1109 are arranged in the injection oil cylinder 1106. The injection piston rod 1109 is connected with an injection rod 1111 by a hough 1110. The other side of the collecting block 901 is provided with a front machine barrel 1112, a transitional nozzle 1113, a transitional nozzle bush 1114 and a small nozzle 1115. The temperature control liquid can be injected into a spiral groove between the transitional nozzle 1113 and the transitional nozzle bush 1114 to control temperature.

Upon preforming, the outlet of the small nozzle 1115 is sealed by a mold (not indicated in the drawing). The stone-based composite material 300 in the preforming device 3 enters into the lower hole of the collecting block 901 and pushes the injection rod 1111 to move to the right. The injection rod 1111 can relatively drive the hough 1110, the injection piston 1108 and the like to move to the right. Both the left side of the injection oil cylinder 1106 and the injection cylinder rear cover 1107 are provided with through holes, thus oil liquid is capable of entering and exiting the injection oil cylinder 1106. When the injection piston 1108 moves to the right, the oil liquid on the right side of the injection oil cylinder 1106 can flow out through the injection cylinder rear cover 1107 and the oil liquid can flow into the through hole of the injection oil cylinder 1106 on the left side.

Upon injection, when the oil liquid enters the right side of the injection oil cylinder 1106 through the injection cylinder rear cover 1107, the injection piston 1108 is caused to move to the left and the oil liquid on the left side of the injection oil cylinder 1106 is caused to flow out through the injection cylinder front cover 1105. The leftward movement of the injection piston 1108 drives the hough 1110, the injection rod 1111 and the like to move leftwards, and finally causes the injection rod 1111 to push the stone-based composite material 300 in the injection machine barrel 1101. The stone-based composite material 300 can enter into the mold (not indicated in the drawing) through the machine barrel 1112, the transitional nozzle 1113 and the small nozzle 1115 under the push of the injection rod 1111.

In the embodiment, the injection piston 1108 is adopted to drive the movement of the injection rod 1111, but motor or other measures can be adopted to drive the movement of the injection rod 1111 as well, which is also within the scope of the invention.

Figure 13:
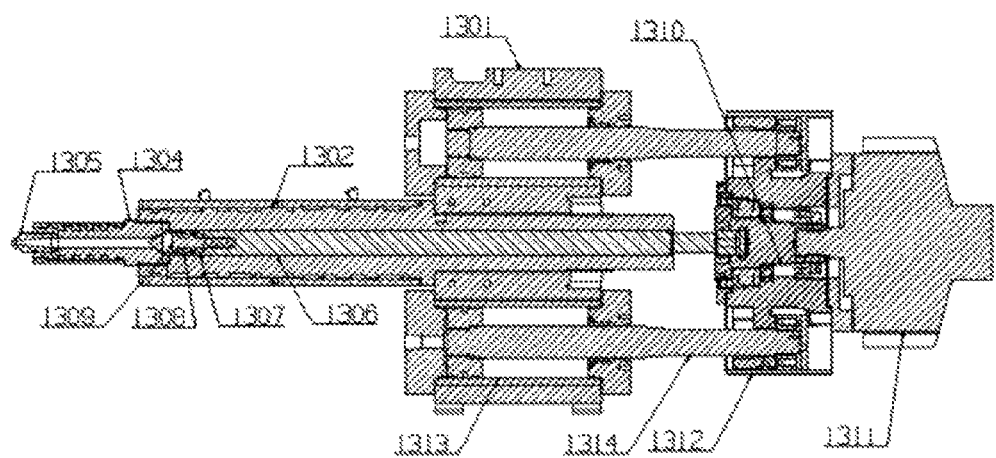
FIG. 13 is the assembly drawing of the mechanism of the invention combining preforming and injection.
Figure 14:
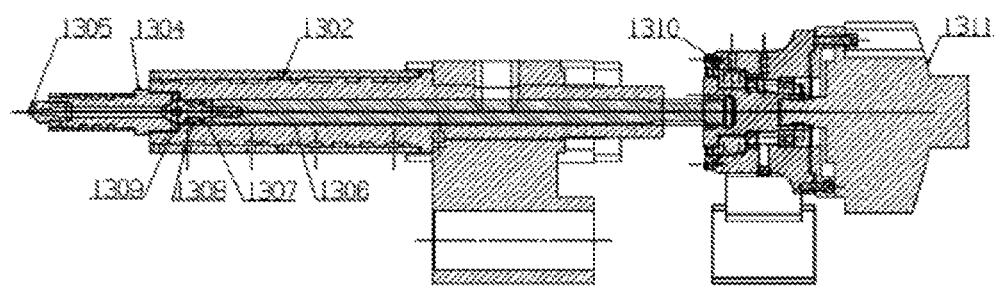
FIG. 14 is the cutaway view of another direction of FIG. 13.

As shown in FIG. 13 and FIG. 14, the preforming device 3, the sealing device 4 and the injection device 5 mentioned above are combined into a whole to constitute another structure. A machine barrel 1302, a transitional nozzle 1304 and a small nozzle 1305 are arranged on the injection table front board 1301. The front end of a screw 1306 in the machine barrel 1302 is provided with a thrust ring 1307, a non-return ring 1308 and a screw head 1309. The other end of the screw 1306 is connected with an oil motor 1311 by a coupling 1310, the oil motor is installed on the injection table rear board 1312, an oil cylinder 1313 is arranged on the injection table front board 1301, and the piston rod 1314 is connected with the injection table rear board 1312.

Upon preforming, the oil motor 1311 drives the screw 1306 to rotate by the coupling 1310 so as to cause the stone-based composite material 300 to move to the front end of the machine barrel 1302 along a groove on the screw 1306. Upon injection, oil liquid pushes the piston rod 1314 and drives the screw 1306 to move by the injection table rear board 1312 and the coupling 1310, so as to cause the stone-based composite material 300 to finally enter into the mold (not indicated in the drawing) through the transitional nozzle 1304 and the small nozzle 1305. The non-return ring 1308 plays a sealing role upon injection.

Figure 15:
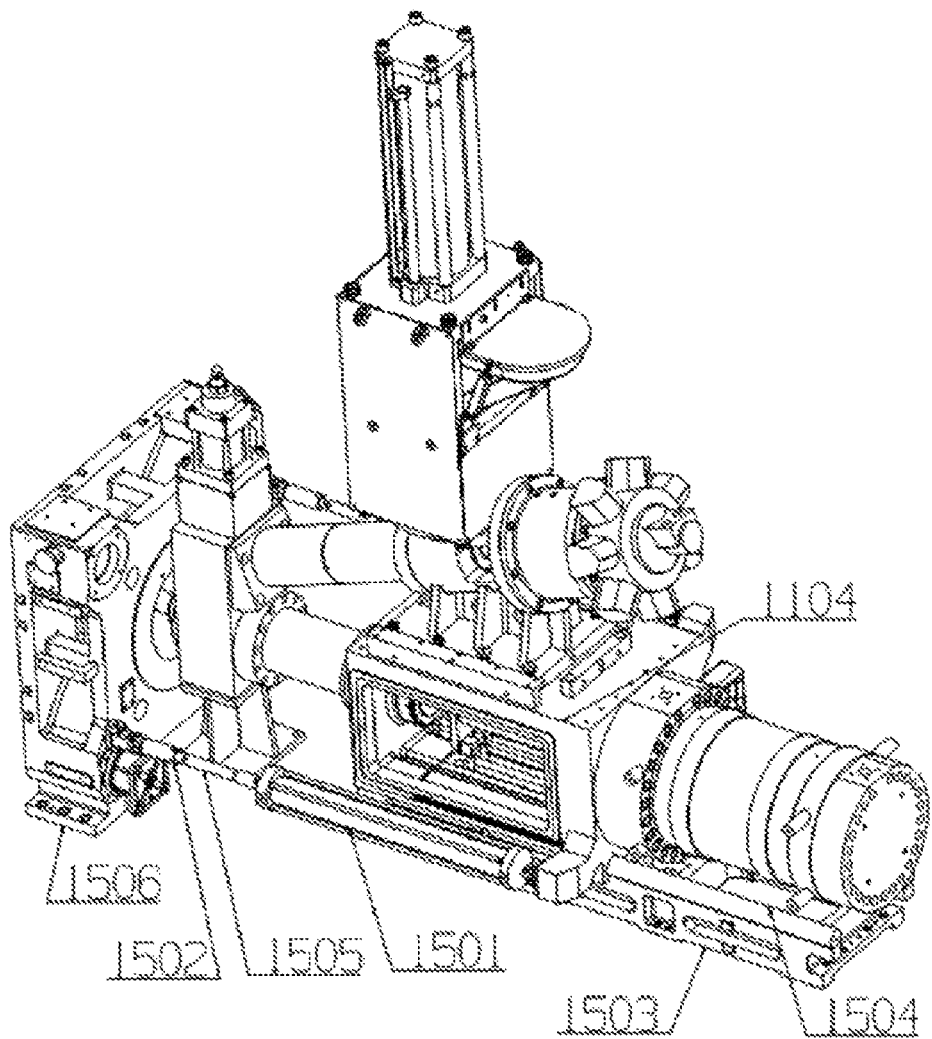
FIG. 15 is the assembly drawing of the sliding transportation device of the invention.

As shown in FIG. 15, the sliding transportation device 6 comprises a sliding transportation oil cylinder 1501, a sliding transportation connector 1502, a guide rod pedestal 1503, an injection table guide rod 1504 and a sliding transportation piston rod 1505. The sliding transportation piston rod 1505 is fixed on a mold board 1506 by the sliding transportation connector 1502, the guide rod pedestal 1503 is fixed on a frame (not indicated in the drawing), the injection table guide rod 1504 is fixed on the guide rod pedestal 1503, and the sliding transportation oil cylinder 1501 is fixed on the injection seat 1104. The injection seat 1104 and the injection table guide rod 1504 can move relatively and the sliding transportation piston rod 1505 and the sliding transportation oil cylinder 1501 can move relatively. When the oil liquid drives the sliding transportation oil cylinder 1501 to move relatively to the sliding transportation piston rod 1505, the injection seat 1104 can move on the injection table guide rod 1504.

Figure 16:
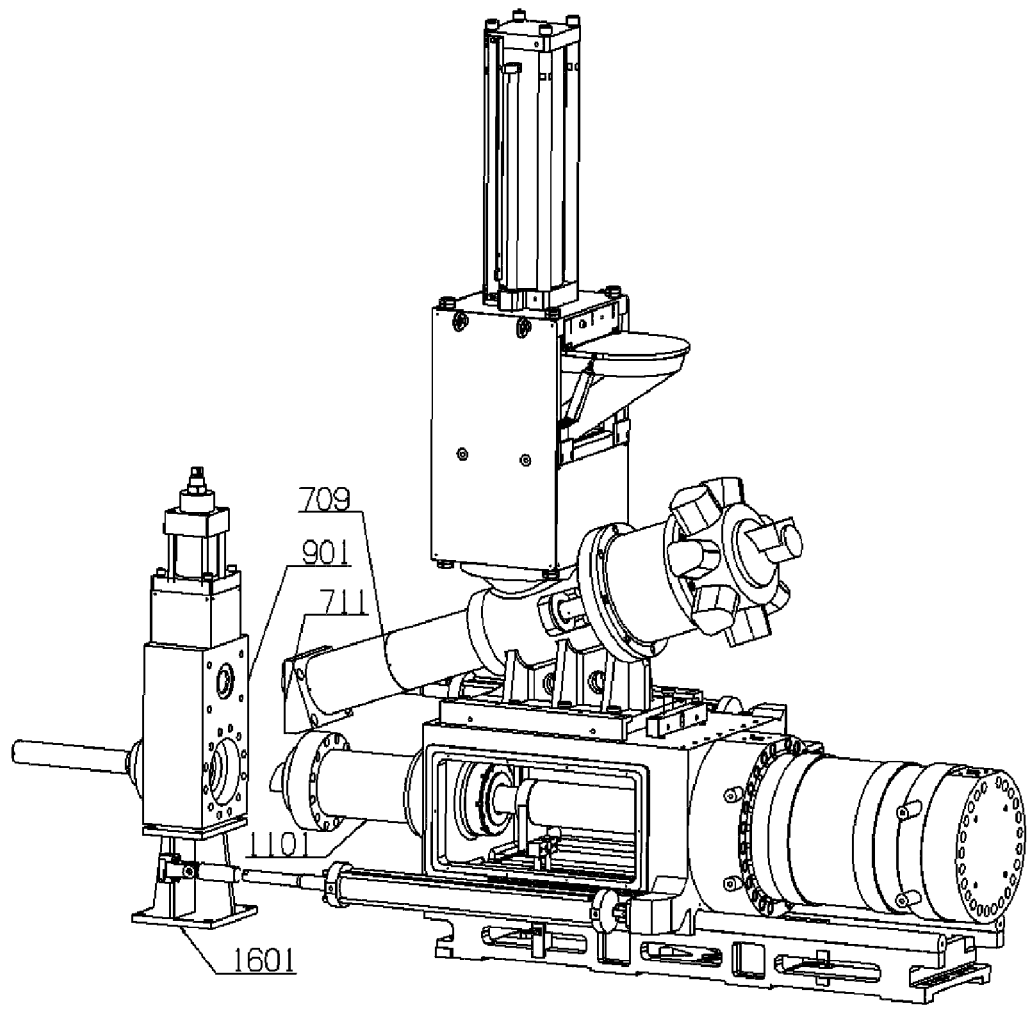
FIG. 16 is the assembly drawing of the discharging device of the invention.

As shown in FIG. 16, a discharging device 7 is installed on the frame (not indicated in the drawing), and the discharging device 7 is the collecting block bearing bracket 1601. The sliding transportation device 6 is used for moving the injection system to cause the collecting block 901 to reach the place above the collecting block bearing bracket 1601.

The collecting block 901 is fixed together with the collecting block bearing bracket 1601. Screw nails between the collecting block 901 and the preforming front machine barrel 711 are removed and then the screw nails between the collecting block 901 and the injection machine barrel 1101 are removed. In this case, the sliding transportation device 6 can be used for separating the injection mechanism, thus being convenient to clean the stone-based composite material 300 remaining in the injection machine barrel 1101 and the preforming machine barrel 709.

The invention claimed is:

1. An injection molding method of stone-based composite material comprising the following steps:

a. putting raw materials into a charging device (2) and then pushing the raw materials into a preforming machine barrel (709) of a preforming device (3) by a pressing component in the charging device (2);
b. keeping the temperature of the preforming machine barrel (709) between 15° C. and 55° C. and compacting the raw materials with the rotation of a preforming screw (712) and transporting the raw materials into a collecting block (901) of a sealing device (4);
c. injecting the raw materials in the collecting block (901) into a mold through a mold gate under the injection force of 50-180 Mpa using an injection device (5);
d. keeping the temperature of the mold between 140° C. and 200° C. and curing time between 40 seconds and 300 seconds;
e. opening the mold to obtain the product.

2. The injection molding method of claim 1, wherein the pressing component of the charging device (2) is a pressing head (314).

* * * * *

UNITED STATES PATENT AND TRADEMARK OFFICE
CERTIFICATE OF CORRECTION

PATENT NO. : 7,959,845 B1
APPLICATION NO. : 12/876606
DATED : June 14, 2011
INVENTOR(S) : Zhang et al.

Page 1 of 1

It is certified that error appears in the above-identified patent and that said Letters Patent is hereby corrected as shown below:

On the Title Page, in the Assignee (73):

Please delete "Haitian Plastics Machinery Group" and insert --Haitian Plastics Machinery Group Co., LTD.--

Signed and Sealed this
Twenty-fourth Day of January, 2012

David J. Kappos
*Director of the United States Patent and Trademark Office*